United States Patent [19]

Knape

[11] Patent Number: 5,309,785
[45] Date of Patent: May 10, 1994

[54] SHIFTING ARRANGEMENT FOR A SPEED CHANGING TRANSMISSION OF A MOTOR VEHICLE

[75] Inventor: Dieter Knape, Heilbronn, Fed. Rep. of Germany

[73] Assignee: Dr. Ing. H.C.F. Porsche AG, Fed. Rep. of Germany

[21] Appl. No.: 947,481

[22] Filed: Sep. 21, 1992

[30] Foreign Application Priority Data

Sep. 19, 1991 [DE] Fed. Rep. of Germany ....... 4131162

[51] Int. Cl.⁵ .................... F16H 59/04; F16H 63/36
[52] U.S. Cl. ........................... 74/477; 74/473 R
[58] Field of Search ................. 74/473 R, 477

[56] References Cited

U.S. PATENT DOCUMENTS

| | | | |
|---|---|---|---|
| 3,242,759 | 3/1966 | Magg et al. | 74/477 |
| 4,432,251 | 2/1984 | Malott | 74/477 X |
| 4,532,823 | 8/1985 | Razzacki | 74/473 R |
| 4,572,020 | 2/1986 | Katayama | 74/477 |
| 4,716,779 | 1/1988 | Heinzelmann | 74/473 R |
| 5,018,404 | 5/1991 | Muller | 74/477 |

FOREIGN PATENT DOCUMENTS 1480679  9/1969  Fed. Rep. of Germany .

*Primary Examiner*—Allan D. Herrmann
*Attorney, Agent, or Firm*—Evenson, McKeown, Edwards & Lenahan

[57] ABSTRACT

A shifting arrangement for a synchronized motor vehicle transmission with six forward gears and one reverse gear has a longitudinally displaceably and rotatably disposed shifting shaft whose shift fingers can be introduced into mutually aligned grooves of shift tongues for the preselecting of the transmission gears. The shift tongues are pivotally connected to swinging forks which are pivotally arranged in the transmission case and, via their forks, engage in a formlocking manner in sliding sleeves of synchronizer clutches. The shifting fork of the reverse gear is fastened on a shift rod situated perpendicularly to the shifting shaft on which a guide rail is constructed for the longitudinal guiding of the shift tongues.

11 Claims, 6 Drawing Sheets

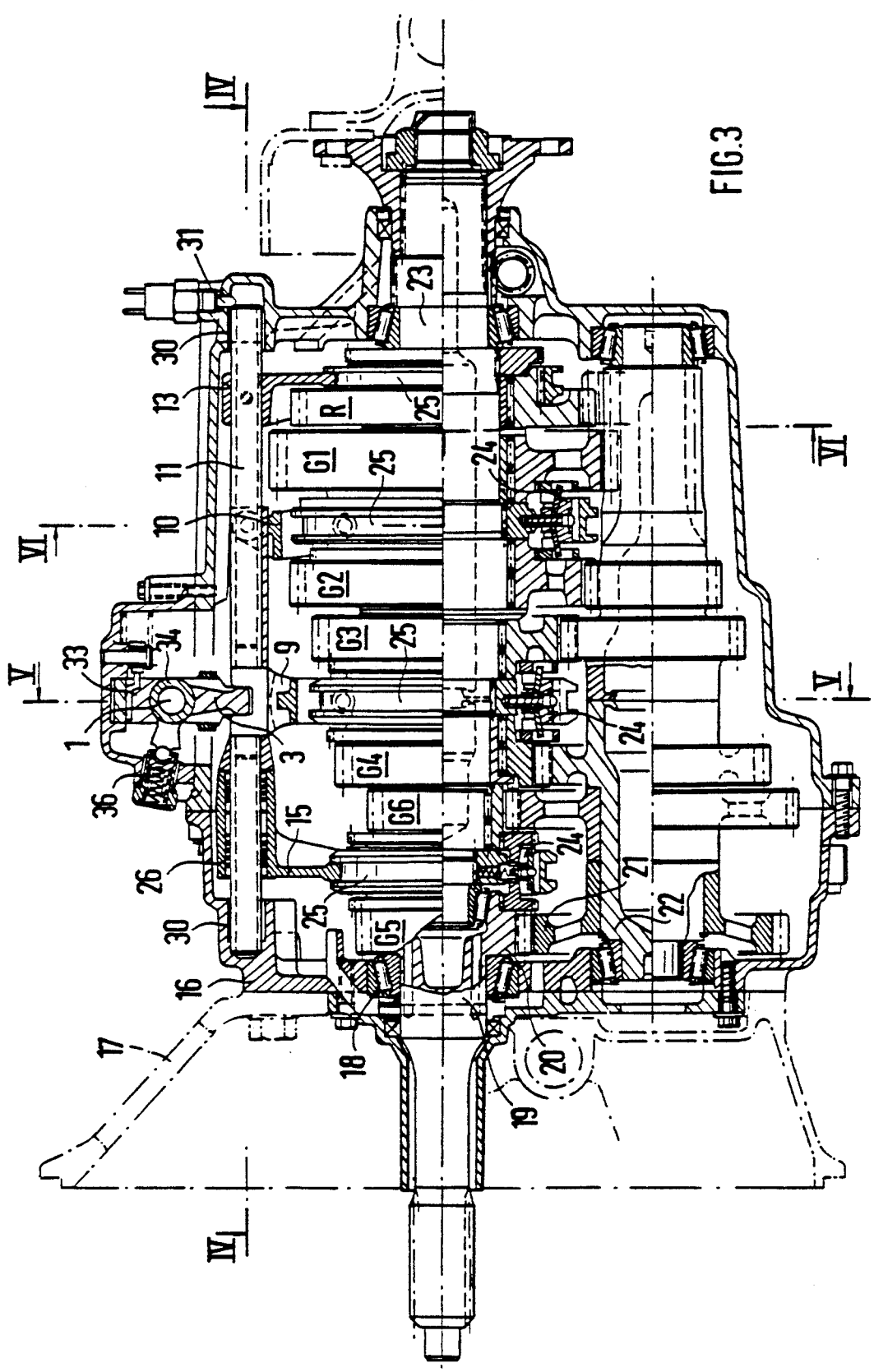

SHIFTING ARRANGEMENT FOR A SPEED CHANGING TRANSMISSION OF A MOTOR VEHICLE

BACKGROUND AND SUMMARY OF THE INVENTION

This invention relates to a shifting arrangement for a speed changing transmission of a motor vehicle having several forward gears that are shiftable by swinging forks engaging in synchronizer clutches and pivotally disposed in the transmission case. A shifting shaft is disposed in a longitudinally displaceable and rotatable manner in the transmission case in parallel to the bearing axis of the swinging forks.

A shifting arrangement of this type is known from the German Patent Document DE-AS 14 80 679. A shifting shaft, which is disposed in the transmission case in a longitudinally movable and pivotal manner, engages by means of a driving dog, according to a preselected position, in one of three gear shift levers. The gear shift levers are connected with two swinging forks disposed in the transmission case in parallel to the shifting shaft via two thrust rods pivotally connected to them. A third swinging fork is connected directly, with respect to the drive, with the gear shift lever disposed directly above it. By means of the rotation of the shifting shaft, the selected swinging fork is also rotated and, by engaging in a synchronizer clutch, shifts the transmission gear assigned to it. The transmission gears are preselected by the longitudinal displacement of the shifting shaft in the grooves of the gear shift levers.

It is an object of the invention to provide a shift mechanism that is more cost effective and more reliable operationally by having a reduced number of piece parts.

This and other objects are achieved by the present invention which provides a shifting arrangement for a synchronized speed changing transmission of a motor vehicle. The arrangement has a plurality of shiftable forward gears, and swinging forks that engage in synchronizer clutches to shift the forward gears, the swinging forks being pivotally disposed in a transmission case. A shifting shaft is disposed in a longitudinally displaceable and rotatable manner in the transmission case in parallel to a bearing axis of the swinging forks. Shift tongues are fastened to the swinging forks and have mutually aligned grooves. A shift finger is fastened to the shifting shaft and is longitudinally displaceable in the grooves. The shift finger interacts with the shift tongues such that by longitudinal displacement in the grooves and a rotating of the shift finger, the transmission gears ar selected.

With the present invention, the shift finger of the shifting shaft interacts directly with shift tongues which are fastened to swinging forks; additional intermediately disposed transmission parts are not required.

In an embodiment of the invention, the shift tongues are pivotally connected to the swinging forks and longitudinally guided on a guide rail which is fixedly mounted on a shift rod disposed perpendicularly with respect to the shifting shaft in the transmission case. The shifting fork for the reverse gear is fastened on the end face on this shift rod.

When the transmission is constructed with an overdrive, the swinging fork of transmission gears G5/G6 is replaced by a shifting fork which is disposed on the shift rod in a rotatable and longitudinally displaceable manner. The same transmission concept can be used for a low-cost modification to implement a normal 6-gear transmission or a transmission with an overdrive.

Other objects, advantages and novel features of the present invention will become apparent from the following detailed description of the invention when considered in conjunction with the accompanying drawings.

BRIEF DESCRIPTION OF THE DRAWINGS

FIG. 1b is a cross-section of FIG. 1a.

FIG. 3 is a longitudinal sectional view of a transmission with a shift mechanism in accordance with an embodiment of the present invention.

DETAILED DESCRIPTION OF THE DRAWINGS

Figure 1:
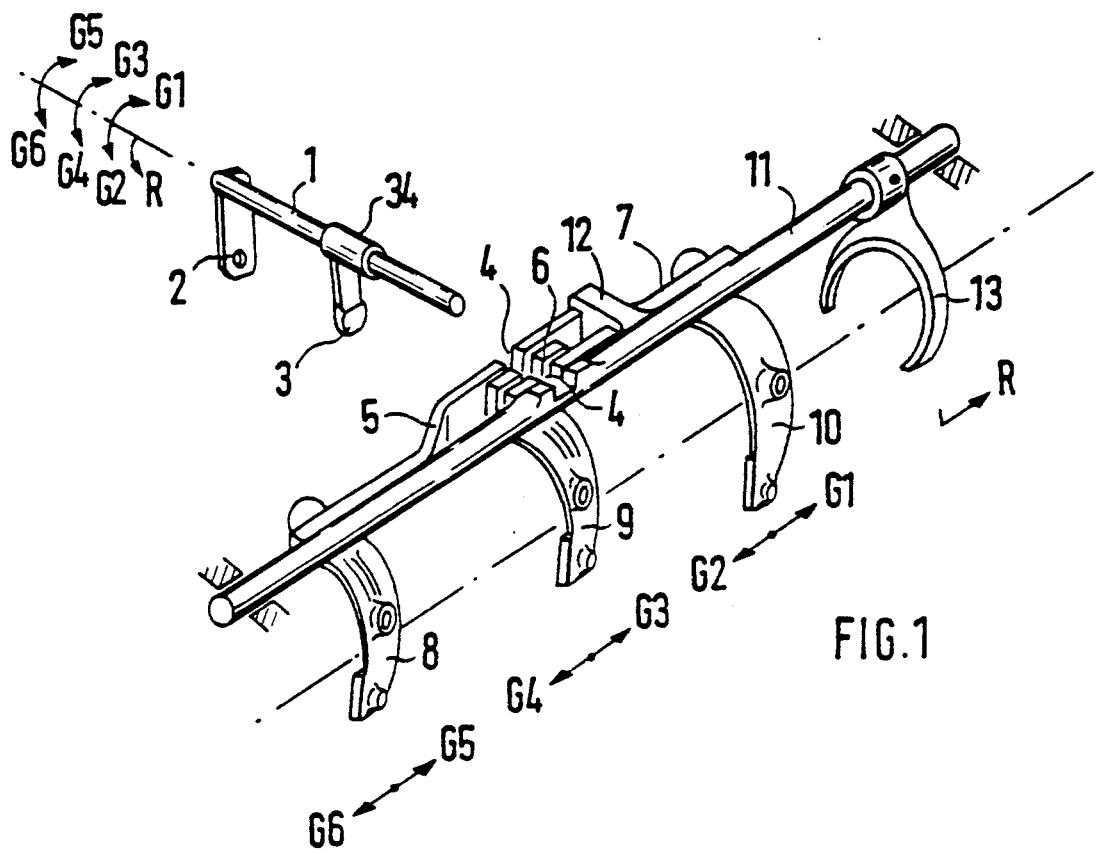
FIG. 1 is a physical representation of the method of operation of a shift mechanism according to an embodiment of the present invention.
Figure 2:
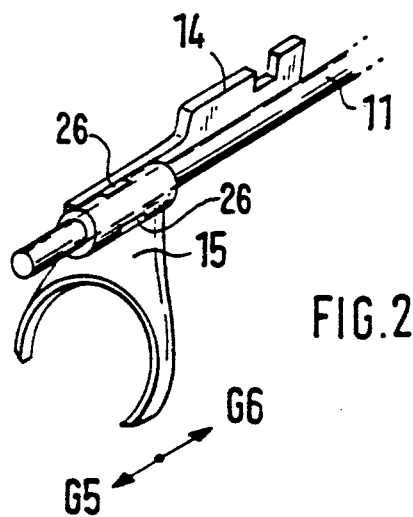
FIG. 2 is a view of a shifting fork used for transmission having an overdrive.
Figure 1A:
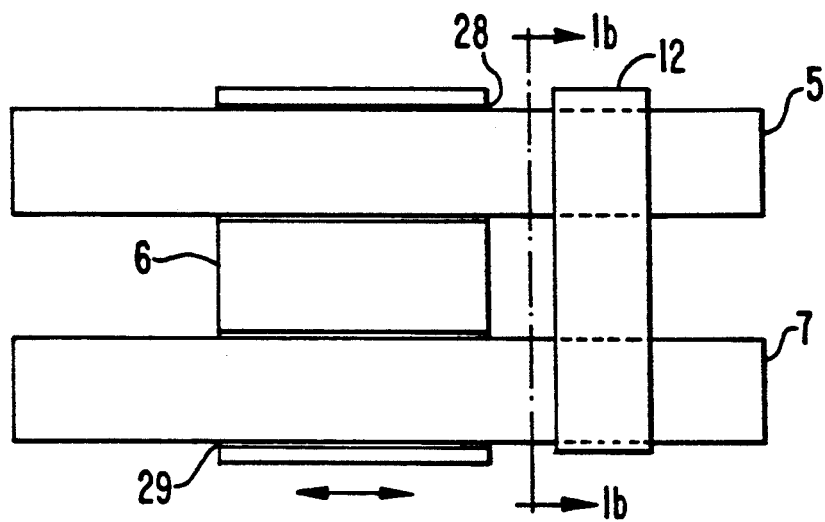
FIG. 1a is a top view of the slide tongues and guide from the present invention.
Figure 1B:
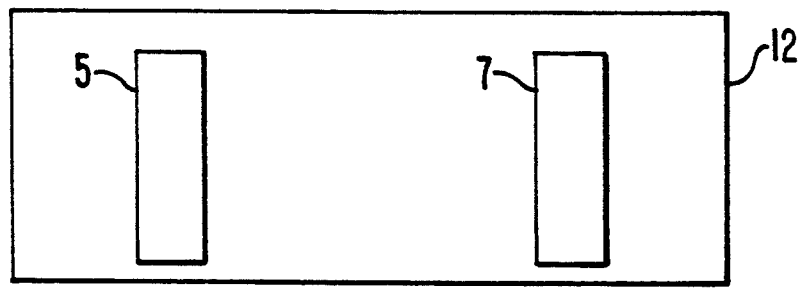

FIG. 1 shows a shifting shaft 1 disposed in a longitudinally displaceable and rotatable manner. This shifting shaft 1 can be operated from the outside by means of a lever 2. A shift finger 3 fastened to the shifting shaft can be introduced into the mutually aligned grooves 4 of three shift tongues 5, 6, 7 which are guided in parallel to one another. The shift tongues 5 and 7 are pivotally linked to swinging forks 8 and 10 which are disposed in the transmission case and shift the gears G5 and G6 as well as G2 and G1 by means of swivelling. A guiding rail 12 mounted on a shift rod 11 is used for the longitudinal guiding of the shift tongues 5, 7. In addition, the shift tongues 5 and 7 of gears G6, G5 and of gears G2, G1 are longitudinally guided on the center shift tongue 6 of gears G4, G3.

A shifting fork 13 for the reverse gear R is fastened to one end of the shift rod 1. Close to the other end of the shift rod 11, the swinging fork 8 is arranged which, in the case of a construction with an overdrive, is replaced by a shifting fork 15 disposed on the shift rod 11 and operated by a shift tongue 14.

A shift mechanism for an overdrive transmission is implemented in FIG. 3 on a 6-gear transmission. In the case of an overdrive, all gearing up is slightly more intensive than in the case of a normal construction. A transmission case 16 is flanged to a clutch housing 17 of the engine. A gear wheel 20 for the fifth transmission gear G5 is fixedly mounted on the drive shaft 19 originating from the engine and disposed in the transmission case 16 by means of a tapered roller bearing 18. This gear wheel 20 continuously mates with a fixed wheel 21 of a countershaft 22 disposed in parallel to the drive shaft 19. Arranged on the countershaft 22 in the following sequence are also the fixed wheels of the 6th gear G6, of the fourth gear G4, of the 3rd gear G3, of the 2nd gear G2, of the 1st gear G1 aswell as of the reverse gear R. The pertaining loose wheels of these transmission gears are arranged on an output shaft 23 which is coaxial to the drive shaft 19 and disposed in it. Gear G5/G6, G4/G3 as well as G2/G1 can be shifted by means of synchronizer clutches 24 disposed between them, in which case shifting forks or swinging forks engage in a formlocking manner in the gearshift sleeves 25 of the synchronizer clutches 24. Via the pair of gear wheels 20, 21, the countershaft 22 is driven continuously. By the operating of one of the synchronizer clutches 24, the output shaft 23 is also set into rotation and rotates, according to the shifted gear, at the corresponding rotational speed. When the fifth gear G5 is shifted, the output shaft 23 rotates at the same rotational speed as the drive shaft In the normal construction of the transmission, gears G5/G6 are shifted by means of a swinging fork 8 and, for a construction with an overdrive, they are shifted by means of a shifting fork 15. By moving the respective shift tongue to the left, the fifth gear is shifted, and by moving the shift tongue to the right, the sixth gear is shifted, without the requirement to change the gear shifting arrangement further. For the two different constructions, only the wheel sets for G5/G6 need be exchanged; instead of the swinging fork 8, the shifting fork 15 is used.

Figure 7:
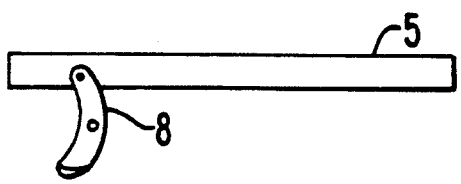
FIG. 7 shows the pivotal connection of the shift tongue to the swinging fork.
Figure 4:
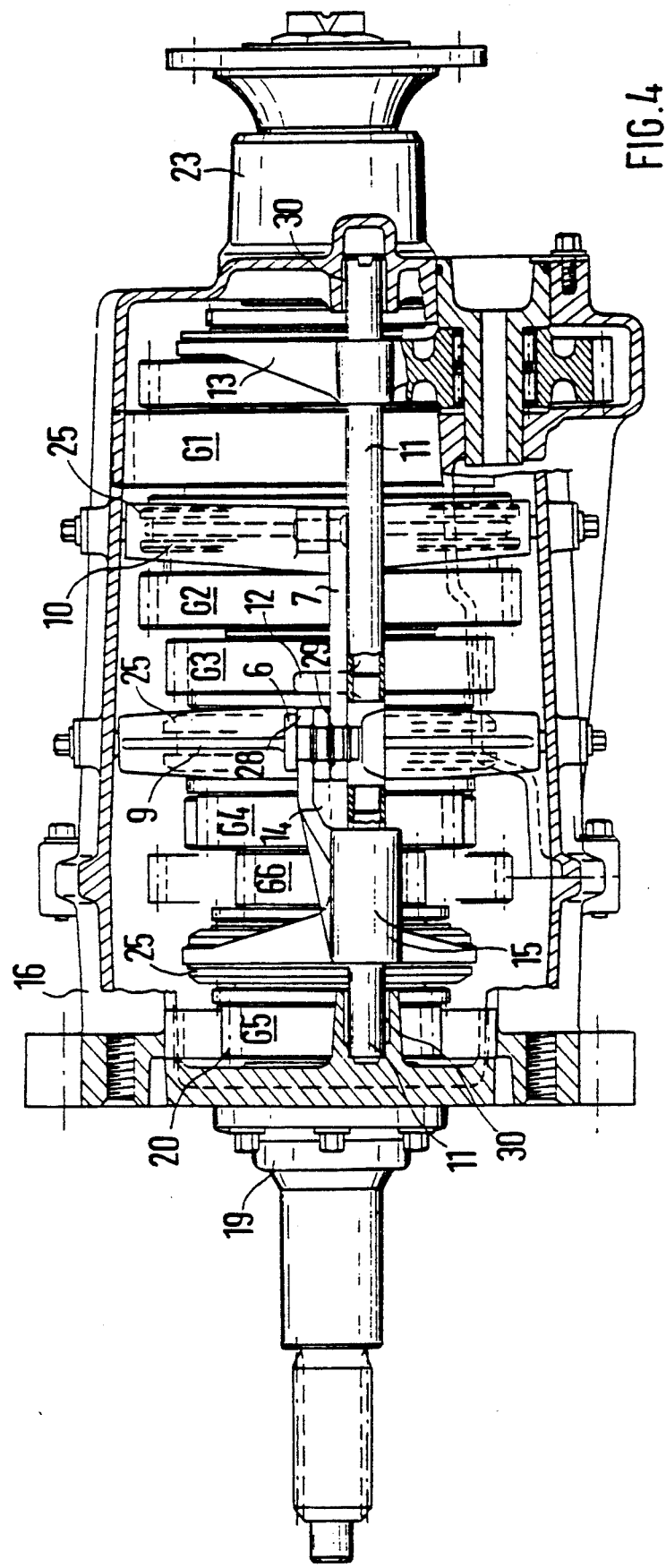
FIG. 4 is a longitudinal sectional view according to Line IV—IV of FIG. 3.

The shifting fork 15 is rotatably disposed in needle bearings 26 on the shift rod 11. Like all other swinging forks, the swinging fork 8 is pivotally disposed on two coaxial pins 27 in the transmission case 16 such as those shown in FIG. 5. The shift tongue 5 pivotally connected to the swinging fork 8 (FIG. 7) is longitudinally guided in a guide rail 12 of the shift rod 11 and in a groove 28 of the center shift tongue 6 of gears G4/G3. In a parallel groove 29 of the shift tongue 6, the shift tongue 7 of gears G2/G1 is longitudinally guided (FIG. 4). The shifting fork 13 for the reverse gear R is pinned together with the shift rod 11. For the preselection of the reverse gear R, the shift finger 3 is advanced into the groove 4 of the shift rod 11. By the rotation of the shifting shaft 1, the shift rod 11 is then displaced longitudinally and the reverse gear R is shifted.

Figure 5:
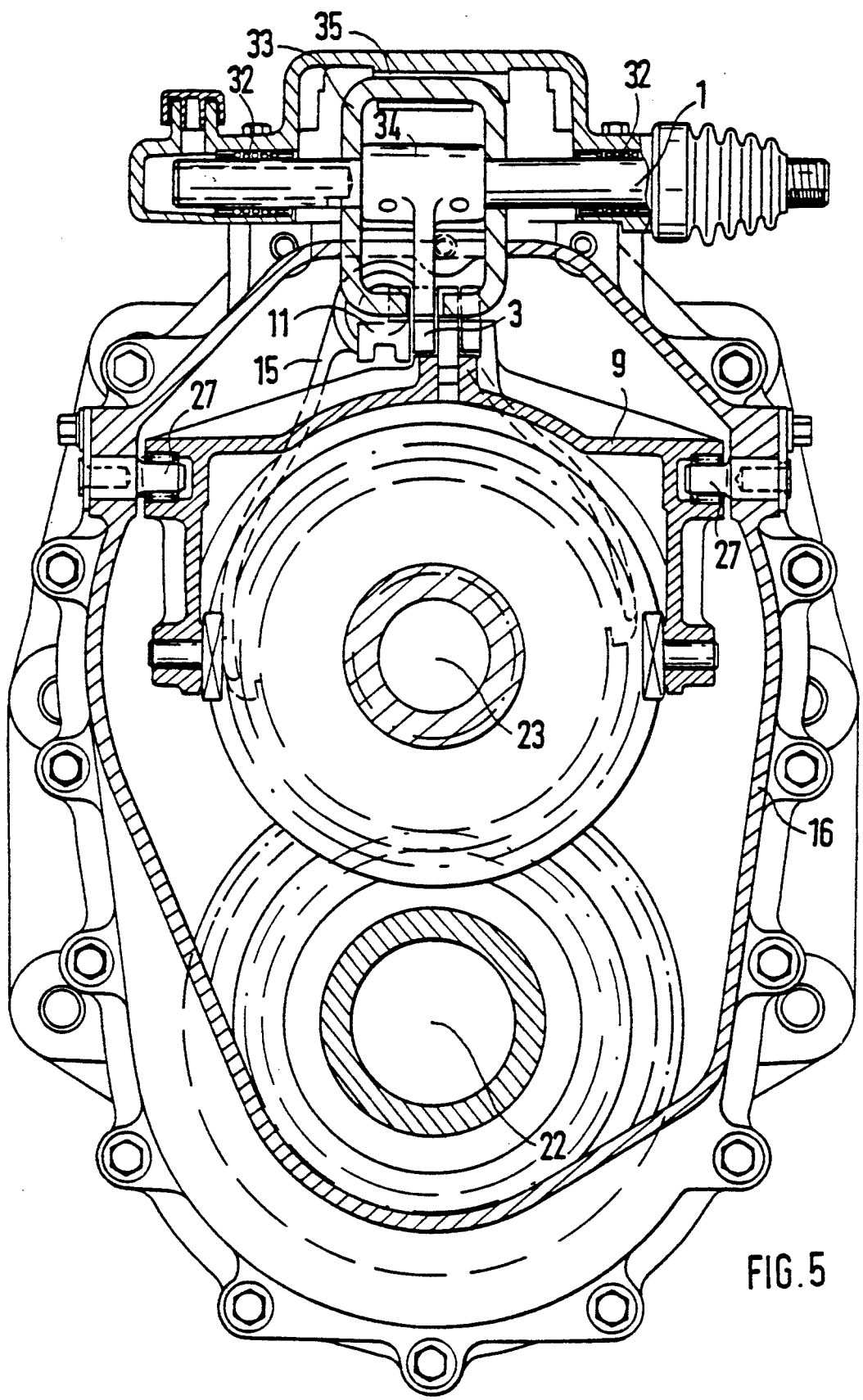
FIG. 5 is a cross-sectional view according to Line V—V of FIG. 3.
Figure 6:
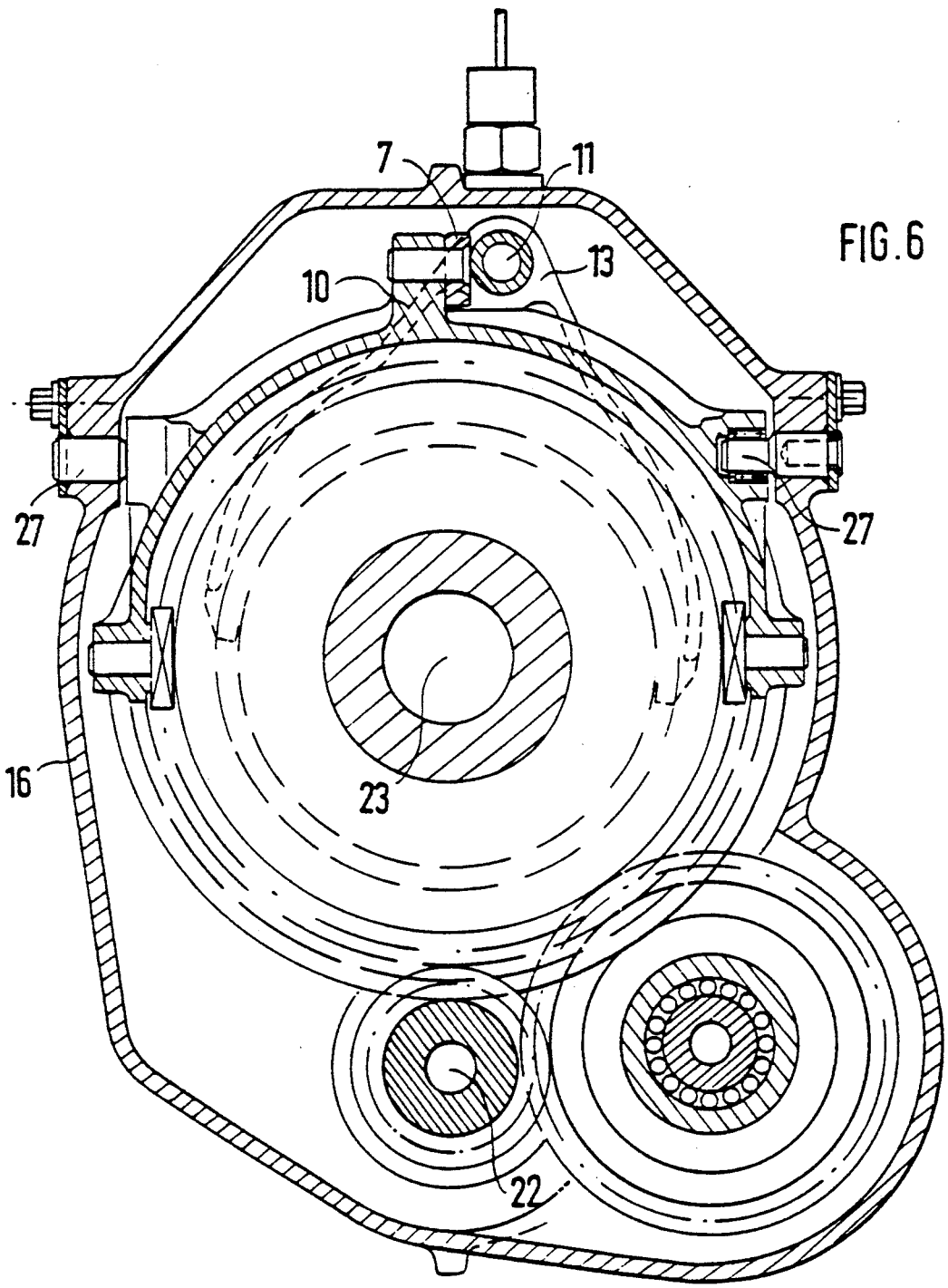
FIG. 6 a cross-sectional view according to Line VI—VI of FIG. 3.

As illustrated in FIGS. 3 to 5, the shift rod 11 is disposed in the transmission case 16 in friction bearings 30 on both ends. The longitudinal position of the shift rod 11 is detected by a sensor 31. The shifting shaft which is perpendicular with respect to the shift rod 11, is disposed in the transmission case 16 in needle bearings 32 on both sides. The three rotating positions of the shifting shaft 1 can be locked by the engaging of a spring pin 36 in a detent profile of the shifting shaft I. In order to avoid an adjacent gear being shifted at the same time when another transmission gear is shifted, a interlock member 33 is provided. The interlock member 33 rests on both ends on the hub 34 of the shift finger 3. The interlock member 33 goes along in the longitudinal movements of the shift finger 3 and, in a form locking manner, engages in the shift tongues of the transmission gears that are not to be shifted. In this manner, the swinging forks of these transmission gears are secured against rotating. The shift finger 3 reaches through the interlocking member 33. In a slot 4 of the interlocking member 33 the shift finger 3 can be freely rotated far enough to be able to shift the selected transmission gear. In a longitudinal groove of the transmission case 16 extending in parallel to the shifting shaft 1, the interlocking member 33 is guided in the longitudinal direction and is secured against rotating.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A shifting arrangement for a synchronized speed changing transmission of a motor vehicle comprising:
   a plurality of shiftable forward gears;
   swinging forks that engage in synchronizer clutches to shift the forward gears the swinging forks being pivotally disposed in a transmission case;
   a shifting shaft disposed in a longitudinally displaceable and rotatable manner in the transmission case in parallel to a bearing axis of the swinging forks;
   shift tongues fastened to the swinging forks and having mutually aligned grooves;
   a shift finger fastened to the shifting shaft and longitudinally displaceable in the grooves, the shift interacting with the shift tongues such that by longitudinal displacement in the grooves and a rotating of the shift finger, the transmission gears are selected; and
   a shift rod having a guide rail, wherein the shift tongues are longitudinally guided on the guide rail.

2. A shifting arrangement according to claim 1, wherein at least two of the shift tongues fastened to the swinging forks are longitudinally guided on the shift tongue of third and fourth gears.

3. A shifting arrangement according to claim 2, wherein the guide rail is forged to the shift rod.

4. A shifting arrangement according to claim 2, wherein all of the shift tongues are pivotally connected to the swinging forks.

5. A shifting arrangement according to claim 1, further comprising a shifting fork arranged on the shift rod in a longitudinally displaceable and rotatable manner.

6. A shifting arrangement according to claim 1, further comprising a shifting fork which is fastened on an end face of the shift rod and which operates a reverse gear (R).

7. A shifting arrangement according to claim 1, further comprising an interlock member that surrounds the shift finger, the shift finger reaching through the interlock member, the interlock member being guided in the axial direction of the shifting shaft in a longitudinally movable manner, being locked in the rotating direction and resting on both end faces of a hub of the shift finger.

8. A shifting arrangement according to claim 7, wherein the interlock member is longitudinally guided in a longitudinal groove of the transmission case and is secured against rotation.

9. A shifting arrangement for a synchronized speed changing transmission of a motor vehicle comprising:
   a plurality of shiftable forward gears;
   swinging forks that engage in synchronizer clutches to shift the forward gears the swinging forks being pivotally disposed in a transmission case;
   a shifting shaft disposed in a longitudinally displaceable and rotatable manner in the transmission case in parallel to a bearing axis of the swinging forks;
   shift tongues fastened to the swinging forks and having mutually aligned grooves;
   a shift finger fastened to the shifting shaft and longitudinally displaceable in the grooves, the shift finger interacting with the shift tongues such that by longitudinal displacement in the grooves and a rotating of the shift finger, the transmission gears are selected; and a shifting fork arranged on the shift rod in a longitudinally displaceable and rotatable manner.

10. A shifting arrangement for a synchronized speed changing transmission of a motor vehicle comprising:

a plurality of shiftable forward gears;

swinging forks that engage in synchronizer clutches to shift the forward gears the swinging forks being pivotally disposed in a transmission case;

a shifting shaft disposed in a longitudinally displaceable and rotatable manner in the transmission case in parallel to a bearing axis of the swinging forks;

shift tongues fastened to the swinging forks and having mutually aligned grooves;

a shift finger fastened to the shifting shaft and longitudinally displaceable in the grooves, the shift finger interacting with the shift tongues such that by longitudinal displacement in the grooves and a rotating of the shift finger, the transmission gears are selected; a shift rod; and a shifting fork which is fastened on an end face of the shift rod and which operates a reverse gear (R).

11. A shifting arrangement for a synchronized speed changing transmission of a motor vehicle comprising:

a plurality of shiftable forward gears;

swinging forks that engage in synchronizer clutches to shift the forward gears the swinging forks being pivotally disposed in a transmission case;

a shifting shaft disposed in a longitudinally displaceable and rotatable manner in the transmission case in parallel to a bearing axis of the swinging forks;

shift tongues fastened to the swinging forks and having mutually aligned grooves;

a shift finger fastened to the shifting shaft and longitudinally displaceable in the grooves, the shift finger interacting with the shift tongues such that by longitudinal displacement in the grooves and a rotating of the shift finger, the transmission gears are selected;

wherein the shift tongues are longitudinally guided on the shift tongue of third and fourth gears (G3/G4); and further comprising a shift rod forged to the guide rail.

* * * * *